LINE PHOSPHOR, COLOR TUBE, REGISTRATION SYSTEM

Filed Aug. 9, 1954 2 Sheets-Sheet 1

INVENTOR.
JAMES W. SCHWARTZ
BY
[signature]
ATTORNEY

LINE PHOSPHOR, COLOR TUBE, REGISTRATION SYSTEM

Filed Aug. 9, 1954 2 Sheets-Sheet 2

INVENTOR.
JAMES W. SCHWARTZ
BY [signature]
ATTORNEY

United States Patent Office 2,917,571

Patented Dec. 15, 1959

2,917,571

LINE PHOSPHOR, COLOR TUBE, REGISTRATION SYSTEM

James W. Schwartz, Princeton, N.J., assignor to Radio Corporation of America, a corporation of Delaware Application August 9, 1954, Serial No. 448,541

11 Claims. (Cl. 178—5.4)

This invention relates to color television and more particularly to arrangements for providing improved reproduction of images in substantially their natural color.

It has been proposed to form a color television image by means of an electron tube having a built-up screen or target area in the form of repeating series of vertical strip-like color producing elements. The individual elements of each strip-like series being adapted to produce light of a particular component color upon being scanned by an electron beam. The deflecting electron beam which scans over the strip-like elements is then sequentially modulated by different color representing signals, in such a manner that the color representative signal with which the electron beam is intensity modulated, during any particular time, coincides with the color of light produced by the particular strip-like element on which the beam impinges. In order to maintain this beam to screen-element relationship correct, it has been proposed to utilize a signal which is generated on the screen or target of the cathode ray tube to control the electron scanning beam. The control of the electron scanning beam should be extremely accurate as slight phase errors will detract from picture quality.

Control signals so generated on the screen or target of a cathode ray tube may be utilized to control the electron beam to secure linear, vertical, radial or other directional scanning movements of a high order of precision, as well as to focus or time the electron beam.

In its more general form the present invention contemplates apparatus and a method for controlling an electron beam in an image reproducing cathode ray device. The electron beam is caused to periodically sample, or impinge upon signal generating areas positioned upon the image screen of the cathode ray device. The signal generating areas generate a control signal upon being excited by energy from the electron beam. During the time when the electron beam impinges upon, or samples, the signal generating areas, the beam is intensity modulated by a concave signal which drops to a low intensity level at some point between its instant of initiation and its instant of termination. The control signal generated by such an intensity modulated beam is fed back to means for controlling the electron beam. The form of the control signal generated by the electron beam modulated by the concave signal, causes phase errors in the sampling to be corrected. The concave signal may be introduced into the system at points other than the beam modulating electrode, in other forms of the invention.

An object of this invention is to provide an improved system for controlling an electron beam in a cathode ray tube.

Another object of this invention is to provide an improved system for the reproduction of television images in substantially natural color.

A further object of this invention is to provide for the reproduction of color television images with improved electron beam scanning registry.

A still further object of this invention is to provide an improved electron beam controlling system by means of which an electron beam may be caused to excite a series of phosphor strips concurrent with the reception of video signals representing the colors produced respectively by the strips.

Other and incidental objects of this invention will be apparent to those skilled in the art from reading the following specification and on inspection of the accompanying drawings in which.

Figure 1:
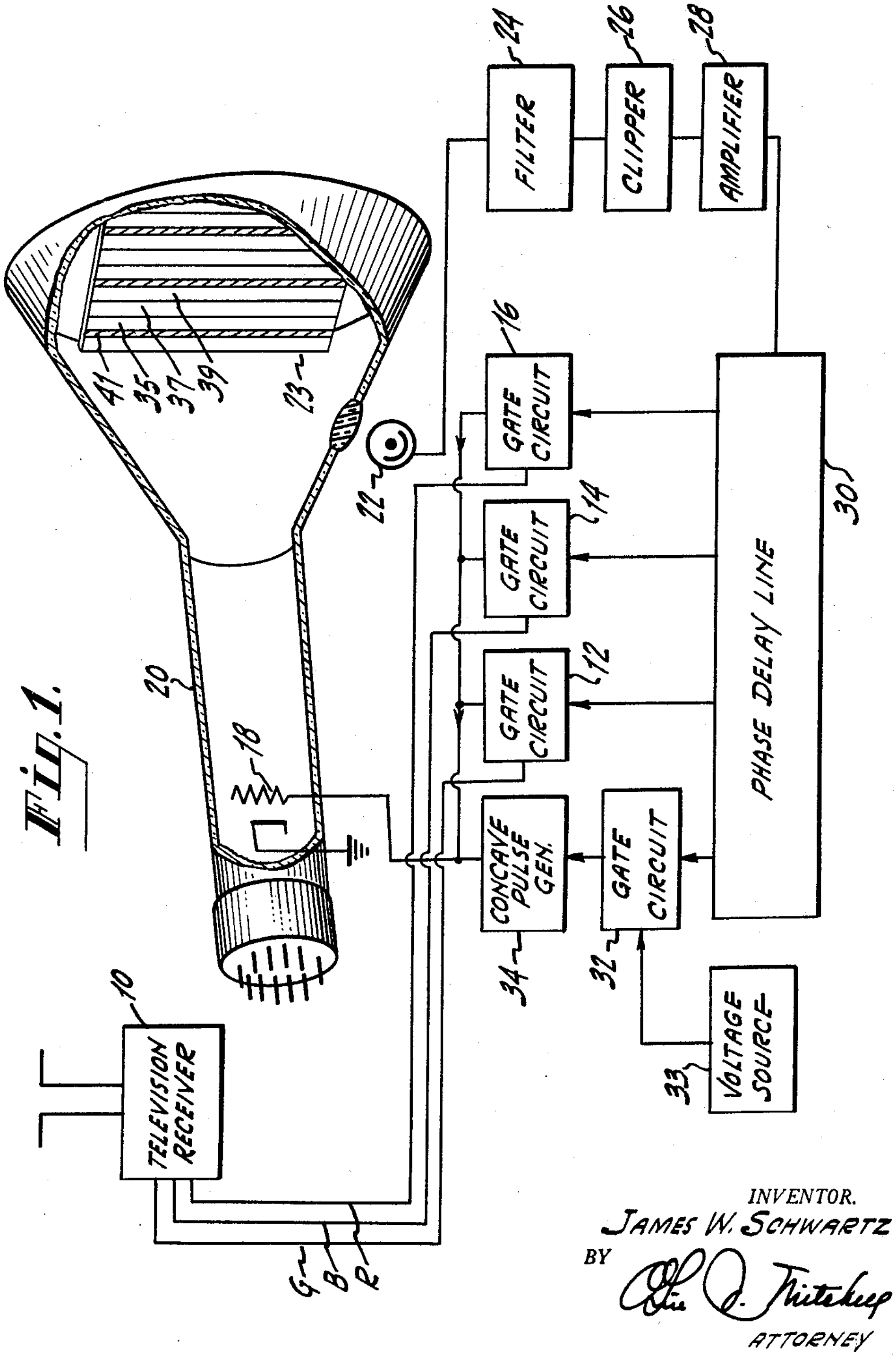
Figure 1 shows a diagrammatic representation of a form of the invention.

Referring now more specifically to Figure 1, there is shown a television receiver 10 which is utilized to derive component color signals from a received color television signal. Such a television receiver is shown and described in Radio and Television News, May 1954, in an article entitled "Fundamentals of Color Television," by Milton S. Kiver. The television receiver 10 is connected to deliver a G signal, representative of a green color component of an image to a gate circuit 12, a B signal, representative of a blue color component of an image, to a gate circuit 14 and an R signal, representative of a red color component of an image, to a gate circuit 16. The gate circuits 12, 14 and 16 are then adapted to be sequentially keyed in such a manner that each will periodically supply a signal to a grid 18 of an image reproducing cathode ray tube 20. A photoelectric cell 22 is positioned adjacent to the image reproducing tube 20, such that it may pick up radiations from a target screen 23 of the tube 20. The signals received by the photocell 22 are then passed through a filter 24 to a clipper 26 and are then amplified in an amplifier 28. The amplified control signals from the amplifier 28 are applied to a phase delay line 30 which has several phase varied outputs. Different outputs from the phase delay line are connected to the gate circuits 12, 14 and 16. A further phase varied output from the phase delay line 30 is connected to a gate circuit 32 which gates an unvarying potential from a voltage source 33. The gated potential through gate circuit 32 controls a concave pulse generator 34. The concave pulse generator 34 is also connected to the control grid 18 of the image reproducing tube 20. In other forms of the invention one of the video signals G, B, or R may be altered to supply the concave nature wave form to generate the control signal.

An understanding of the operation of the system shown in Figure 1 will be furthered by reference to the target screen 23 embodied in the image reproducing tube 20. The screen consists of groups of strip-like color reproducing phosphor elements, 35, 37, and 39 and a group of signal generating strip-like phosphor elements 41. The signal generating strip-like phosphor elements 41 may be composed of ultra violet light emitting phosphor material or other signal generating material as secondary emissive material, or electron pickup material.

In the operation of the circuit of Figure 1 the phase delay line 30 receives signals which are formed by the cathode ray beam impinging upon the ultra violet signal generating strip-like elements 41 of the target screen 23. The signals when applied to the phase delay line 30 are in effect formed into 4 different signals, each phase shifted 90° from the other. The individual signals are then fed to a different one of the gate circuits 32, 12, 14 and 16 wherein they control the application of the video signals G, B, or R or a concave pulse to the control grid 18 of the image tube 20. The application of the concave pulse to the control grid 18 from the concave pulse generator 34 is timed to substantially occur during the period when the cathode ray beam is impinging upon the ultra violet light emitting phosphor element 41 of the target screen 23. The electron beam thus becomes intensity modulated during the scanning of the strip 41, with a signal having a concave variation. The signal generated by the beam impinging upon the ultra violet phosphor strip 41 will thus be varied in accordance with the pulse signal from the concave pulse generator 34 of Figure 1.

Figure 2:
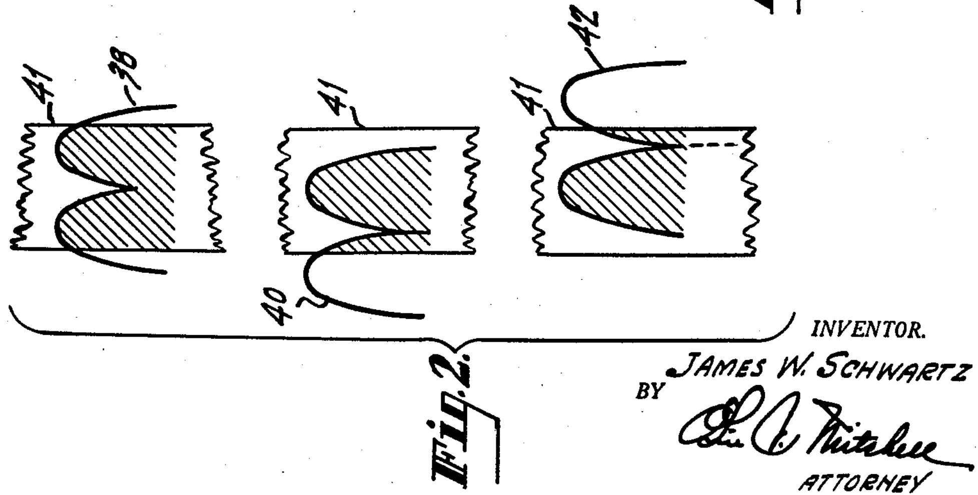
Figure 2 shows curves of waveforms generated within the system of Figure 1.

The curves 38, 40 and 42 of Figure 2 are shown superimposed upon the ultra violet phosphor element 41. Each of the curves 38, 40 and 42 is plotted with time as abscissa and signal intensity as ordinate. The curves 38, 40 and 42 are concave in shape, or rise to a peak, drop to a minimum then again rise to a peak. The superimposition of the curves on sections of the phosphor strip-like elements 41 assumes for purposes of illustration that the deflection of the electron beam which is intensity modulated by the signal shown in curves 38, 40 and 42, is linear and therefore coincides to time. Due to the fact that the curves 38, 40 and 42 are representative in amplitude of beam intensity, the ideal control signals assumed for illustration, which will be generated by the ultra violet phosphor emitting elements 41, will vary as the shaded area which is common to the ultra violet phosphor elements 41 and the curves 38, 40 and 42. Curve 38 is representative of the beam sample signal, or the beam intensity modulation, in which phase position is correct with respect to the ultra violet light emitting element 41. The curve 40 is a representation of beam sampling signal which is phase advanced with respect to the desired timing. It may be seen with respect to the curve 40 that due to the concave nature of the curve 40 the center of gravity, or the center of the bulk of the shaded representation of the signal generated by the ultra violet phosphor element 41 will be shifted to the right from the time center of the pulse. It may therefore be seen that when the phase of the sampling signal is premature the bulk of the resulting control pulse, which is generated, will be phase delayed and a corrective effect will be obtained.

Consider now the curve 42 which is representative of a beam sampling signal shown to be phase delayed or shifted to the right, with respect to its proper or ideal phase positioning. Again the shaded area or the area common to both the curve 42 and the ultra violet strip 41 will be indicative of the control signal generated at the image screen 23 of the image reproducing tube 20. The shaded area may be seen to be shifted to the left or in effect time advanced, in bulk, from the true time center of the concave signal of curve 42 which occurs at the minimum signal intensity point of the signal of curve 42. As in the case of the phase advanced signal of curve 41 a corrective effect is again gained and a phase delay sampling signal of curve 42 will tend to generate a phase advanced control signal as shown by the shaded area under curve 42.

From the consideration of the Figure 2 it may be seen that in the event the phase varying signals from the phase delay line 30 are not correctly phase positioned with respect to the vertical strip-like elements, the use of a concave intensity modulating signal or sampling signal for the electron beam in the image reproducing tube 20, during the period when the beam impinges upon the signal generating ultra violet strips 41 will tend to correct for any undesired phase variation. In other forms of the invention the concave signal forming may be done at other points of the circuit, for example, the photo-electric cell 22 may receive a concave varying supply voltage.

Figures 3, 4:
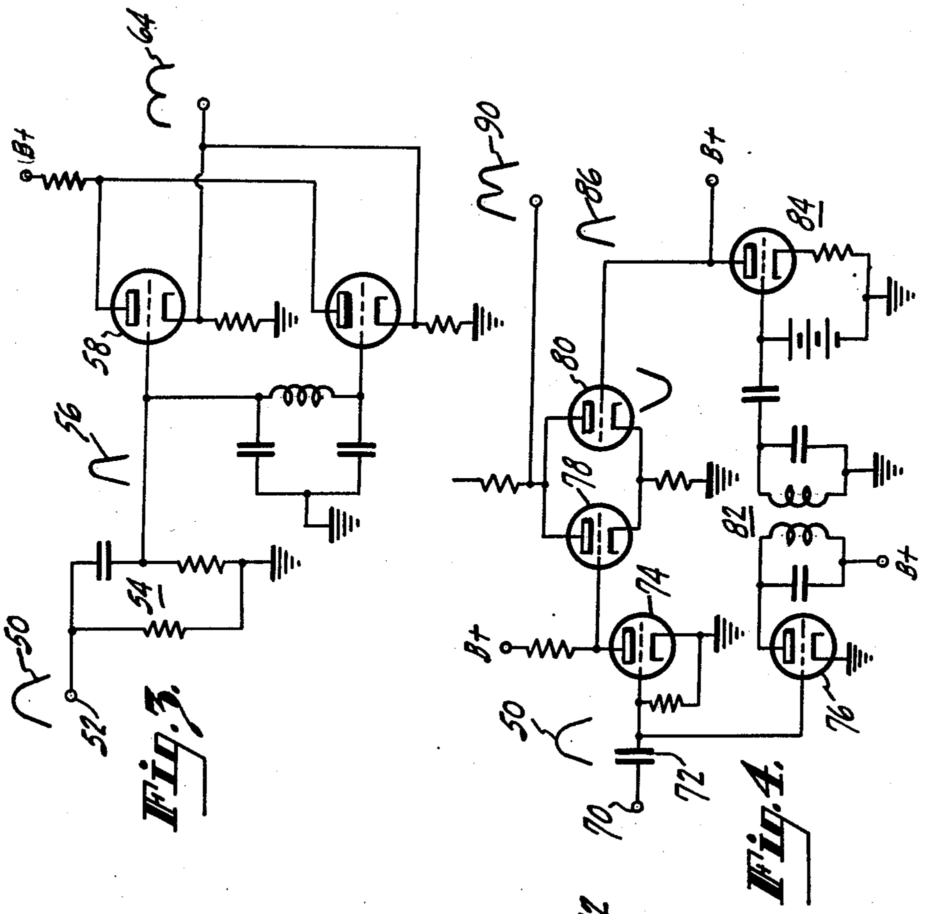
Figure 3 shows one form of one pulse generator which may be used in the system of Figure 1.
Figure 4 shows another form of concave pulse generator which may be used in the system of Figure 1.

Referring now to Figure 3 there is shown a form of a concave pulse generator 34 which may be used in connection with the system of Figure 1. A gating pulse 50 from the phase delay line 30 and the voltage source 33 will be applied to terminal 52 through the gate circuit 32 and thence to the resistance-capacitance network 54 which will tend to narrow the gating pulse 50 to form a narrowed pulse 56. The narrowed pulse 56 is applied directly to the control grid of tube 58, and is applied to the control grid of tube 60 through a delay line 62. The output which is common to both tubes 58 and 60 is from their cathodes and is therefore not phase inverted. Both tubes receive the narrowed pulse 56 for an input signal, therefore the output of the tubes will contain two representations of the narrowed pulse 56, one being slightly phase delayed from the other. The resulting pulse 64 will thus be of the desired concave or two peak intensity waveform.

Referring now to Figure 4 there is shown another form of a concave pulse generator 34 which may be used in the system of Figure 1. A terminal 70 is provided to receive the gating pulse 50 from the gate circuit 32. The gating pulse 50 is then connected through the coupling circuit 72 to the grids of both vacuum tubes 74 and 76. The output from the vacuum tube 74 will be an amplified form of the gating pulse 50 and this signal is applied to the control grid of a tube 78. Tube 78 is cathode coupled to a tube 80 in such a manner that signals appearing at the grid of tube 78 will appear at the cathode of tube 80.

The tube 76 amplifies the gating pulse 50 and couples it through a transformer coupling circuit 82 to a pulse spike generating circuit 84. The pulse spike generating circuit 84 with the transformer 82 serves to generate a narrow spike pulse 86 from the amplified gating pulse 50. The spike pulse 86 is then applied to the control grid of the tube 80. The output signal which appears at the plate of tube 80 will thus contain the added result of the amplified gating pulse and the spike pulse 86. Due to its inverted form the spike pulse 86 will, in effect, be subtracted from the amplified pulse at approximately the midpoint of the amplified pulse, thereby forming the desired concave pulse 90, which may be applied to the screen grid 18 of the image tube 20.

It may therefore be seen that the invention may be utilized to improve the keying of various component color image producing signals onto a cathode ray beam which alternatively impinge upon various color reproducing elements.

Having thus described the invention, what is claimed is:

1. In a television system embodying a color kinescope having a screen formed of groups of strip-like elements, certain of said strip-like elements being capable of producing light of certain component image colors when excited by an electron beam, certain other of said groups of strip-like elements for generating a control signal when excited by said electron beam, sensing means for sensing said control signal, electron beam control means connected to receive said control signal, said electron beam control means adapted to control said electron beam commensurate with said control signal, means for intensity modulating said electron beam such as to cause the intensity of said electron beam to vary as an alternating waveform function having first and second intensity maxima separated by an intensity minimum, said maxima and minimum occurring during a predetermined time, said predetermined time being such as to substantially coincide with the time during which said electron beam impinges on one of said elements of said certain other of said groups of strip-like elements.

2. Apparatus according to claim 1 wherein said certain other of said groups of strip-like elements comprise strip-like elements composed of an ultra violet light emitting phosphor.

3. Apparatus according to claim 2 wherein said sensing means comprises a photo-electric device sensitive to detect ultra violet light signals.

4. In a color television system image reproducing apparatus comprising a multicolor kinescope and a means for producing an electron beam and deflecting it horizontally and vertically to scan a raster, and a luminescent screen including a multiplicity of vertical strip-like light-producing elements capable respectively of producing light of different component image colors when excited by an electron beam, said light-producing elements being arranged so that different color light-producing elements are traversed periodically by said beam in successive screen areas during each horizontal beam deflection, said screen also including strip-like signal producing elements in place of predetermined ones of said light producing elements, means to intensity modulate said beam in accordance with video signals representing said component image colors concurrently with said periodic beam travel of said light producing elements to produce image reproducing light, means to modulate said beam with a substantially alternating waveform such as to cause the intensity of said beam to rise to a predetermined level, then to drop off sharply, then to again rise, substantially concurrently with said beam traversal of said signal producing elements to produce signals representative of the registration of said beam with said screen elements and means responsive to said control signals to control said beam in such a manner as to effect substantially accurate beam to screen element registration.

5. A device according to claim 4 wherein said strip-like signal producing elements are composed of an ultra violet light emitting phosphor.

6. In a color television system image reproducing apparatus comprising a multicolor kinescope and a means for producing an electron beam and deflecting it horizontally and vertically to scan a raster, and a luminescent screen including a multiplicity of vertical strip-like light producing elements capable of respectively producing light of different component image colors when excited by an electron beam, said light producing elements being arranged such that different color light producing elements are traversed periodically by said beam in successive screen areas during each horizontal beam deflection, said screen also including strip-like signal producing elements in place of predetermined ones of said light producing elements, beam intensity control means to control the intensity of an electron beam in said multicolor kinescope, a switching means adapted to be connected to a source of video signals, said switching means being connected to said beam intensity control means such as to modulate said beam in accordance with said video signals concurrently with said period of beam travel of said light producing elements to produce image reproducing light, a pulse generator, means connecting said pulse generator to said switching means to modulate said beam with a substantially alternating waveform signal having first and second intensity maxima and an intervening intensity minimum substantially concurrently with said beam traversal of said signal producing elements to produce signals representative of the registration of said beam with said screen elements, and means responsive to said control signals to control the said beam in such a manner as to effect substantially accurate beam to screen element registration.

7. In a color television system image reproducing apparatus comprising a multicolor kinescope and a means for producing an electron beam and deflecting it horizontally and vertically to scan a raster, and a luminescent screen including a multiplicity of vertical strip-like light producing elements capable of respectively producing light of different component image colors when excited by an electron beam, said light producing elements being arranged such that different color light producing elements are traversed periodically by said beam in successive screen areas during each horizontal beam deflection, said screen also including strip-like signal producing elements in place of predetermined ones of said light producing elements, beam intensity control means to control the intensity of an electron beam in said multicolor kinescope, a switching means adapted to be connected to a source of video signals, said switching being connected to said beam intensity control means such as to modulate said beam in accordance with said video signals concurrently with said period of beam traversal of said light producing elements to produce image reproducing light, a pulse generator, means connecting said pulse generator to said switching means to modulate said beam with a signal waveform having sequentially two peak intensities of the same amplitude concurrently with said beam traversal of said signal producing elements to produce signals representative of the registration of said beam with said screen elements, and means responsive to said control signals to control said switching means in such a manner as to cause said beam intensity control means to modulate said beam with a predetermined video signal at a predetermined time.

8. Apparatus as defined in claim 7 wherein said predetermined video signal is representative of one component color, and said predeterm ned time is a time during which said beam excites a light producing element for producing light of said one component color.

9. In a system adapted to produce images in color from a plurality of video voltage waves by employing an image reproducing device having energizing means for effectively energizing in time sequence elemental areas of an image reproducing electrode and control means for modulating said energizing means with one of said plurality of video voltage waves concomitantly with the energization of a predetermined elemental area of said electrode the combination comprising, control elements adapted to be energized in spaced time sequence by said energizing means to develop a control signal, means including a pulse generator coupled with said control means for developing a control pulse having sequentially two peak intensities and an intervening minimum intensity all occurring substantially during the time when one of said control elements is energized, means for causing said control signal to be modulated with said control pulse, sensing means for sensing said control signal, and means coupled with said sensing means and adapted to be coupled to said control means for effecting the application of a said one of said plurality of video voltage waves to said control means simultaneously with the energization of said predetermined elemental area.

10. In a color television signal processing system including an image reproducing device having an image reproducing electrode comprising sequential contiguous image producing elemental areas, energizing means for energizing said areas in predetermined cyclic time sequence and control means for modulating said energizing means in accordance with a predetermined one of a plurality of video signals upon the energization of certain of said areas the combination comprising, control elements spaced in predetermined relation to said areas and adapted to be activated by said energizing means to produce a control signal, means including a pulse generator coupled with said control means for developing a control pulse having sequentially two equal peak intensities separated by a minimum intensity, all occurring substantially during the time when one of said control elements is energized, means for causing said control signal to be modulated by said control pulse, sensing means for sensing said control signal, and means including wave forming means coupled between said sensing means and said control means for effecting the application of each of said plurality of video signals and said control pulse simultaneously with the energization of predetermined portions of said electrode.

11. In a system for producing images in color from a plurality of video voltage waves, which system employs an image reproducing device having energizing means for effectively energizing, in time sequence, elemental areas of an image reproducing electrode and control means for modulating said energizing means with one of said plurality of video voltage waves concomitantly with the energization of a predetermined elemental area of said electrode, the combination comprising: control elements adapted to be energized in spaced time sequence, means associated with said kinescope for deriving control signals from said control elements indicative of the time of energization of said elements, pulse generating means generating a control pulse having sequentially two peak intensities separated by an intensity minimum, said peaks and minimum having a total duration of substantially the time in which one of said control elements is energized, means for modulating said control signals with said peaked control pulse, such that the character of said modulated control signal is indicative of the phase relationship between the energization of said control elements and the modulation of said control signals by said control pulses, and means responsive to said modulated control signal and associated with said kinescope for controlling the time of energization of said elemental areas with respective ones of said video voltage waves.

References Cited in the file of this patent

UNITED STATES PATENTS

| | | |
|---|---|---|
| 2,635,141 | Bedford | Apr. 4, 1953 |
| 2,648,722 | Bradley | Aug. 11, 1953 |
| 2,673,890 | Moulton | Mar. 30, 1954 |
| 2,681,381 | Creamer | June 15, 1954 |
| 2,715,155 | Bryan | Mar. 9, 1955 |